United States Patent [19]

Suvanto

[11] Patent Number: 4,996,014
[45] Date of Patent: Feb. 26, 1991

[54] METHOD FOR MANUFACTURE OF SPIKE RIVITS

[75] Inventor: Erkki Suvanto, Porvoo, Finland

[73] Assignee: Neste Oy, Finland

[21] Appl. No.: 469,489

[22] PCT Filed: Sep. 5, 1989

[86] PCT No.: PCT/FI89/00167
§ 371 Date: Apr. 12, 1990
§ 102(e) Date: Apr. 12, 1990

[87] PCT Pub. No.: WO90/02619
PCT Pub. Date: Mar. 22, 1990

[30] Foreign Application Priority Data
Sep. 7, 1988 [FI] Finland .................................. 884122

[51] Int. Cl.$^5$ ...................... B29C 43/20; B29C 43/14; B32B 1/10
[52] U.S. Cl. .................................... 264/113; 264/120; 419/66; 425/356; 425/412; 425/422
[58] Field of Search .................... 264/112, 113, 120; 419/66, 6, 7; 425/356, 412, 414, 422, 78

[56] References Cited

U.S. PATENT DOCUMENTS

| 2,357,407 | 9/1944 | Kurtz | 419/66 |
|---|---|---|---|
| 2,815,535 | 12/1957 | Bodine | 425/1 |
| 3,255,278 | 6/1966 | Smith | 264/113 |
| 3,255,659 | 6/1966 | Venghiattis | 419/66 |
| 4,419,413 | 12/1983 | Ebihara | 264/113 |
| 4,472,350 | 9/1984 | Urano | 419/6 |

FOREIGN PATENT DOCUMENTS 1325136 8/1973 United Kingdom .

Primary Examiner—Mary Lynn Theisen
Attorney, Agent, or Firm—Steinberg & Raskin

[57] ABSTRACT

The invention concerns a method for the manufacture of a rivet for a fixed spike or for a sleeve-mounted spike, respectively, by pressing in a mold. In the method of the invention, the cavity space in the mold (10,20), corresponding to the shape of the spike to be manufactured, is first filled to the desired extent with a first material (1) to form the body part of the spike. Thereupon a first punch (30), whose diameter is substantially smaller than the diameter of the cavity space in the mold, is fitted into the cavity space concentrically with the cavity space, and the annular space between said first punch (30) and the cavity space is filled with a second material (20) so as to form the wear-resistant surface layer for the spike. Next, the first punch (30) is removed, and the space remaining after said punch is filled with a third material. Ultimately the spike is pressed to the desired shape and density, whereinafter the spike is removed from the mold. The invention also concerns apparatus for carrying out the method.

11 Claims, 3 Drawing Sheets

METHOD FOR MANUFACTURE OF SPIKE RIVITS

BACKGROUND OF THE INVENTION

The invention concerns a method for the manufacture of a rivet for a fixed spike or for a sleeve-mounted spike, respectively, by pressing in a mold.

The invention concerns apparatus for carrying out the method for the manufacture of a rivet for a fixed spike or for a sleeve-mounted spike, respectively, the apparatus comprising a mold provided with a cavity space, pressing equipment, and filling equipment.

The commonest structure in the prior-art fixed spikes and in the rivet parts of sleeve-mounted spikes, respectively, is such that the fixed spike or the rivet part of a sleeve-mounted spike, respectively, is provided with a separate hard-metal tip. Such a spike is usually manufactured in a mould consisting of several parts, so that the mold parts are provided with punches acting in the axial direction of the spike to be manufactured, the spike blank being pressed axially in opposite directions by means of these punches. It is a drawback of such methods of manufacture and apparatuses that they require several separate working steps and, moreover, the construction of the apparatuses and of the molds is complicated.

SUMMARY OF THE INVENTION

The object of the present invention is to provide an improvement over the prior art methods of manufacture and apparatuses. A more specific object of the invention is to provide a method of manufacture and an apparatuses intended for carrying out the method which are intended in particular for the manufacture of such a large-tip spike wherein the wear-resistant layer to be formed in the tip portion of the rivet is formed as an annular part around the tip. Such a spike has been described earlier in the Finnish Patent Application No. 880294.

In view of achieving the objectives stated above and those that will become apparent herein after the method in accordance with the invention comprises the following steps:

the cavity space in the mold, corresponding to the shape of the spike to be manufactured, is filled to the desired extent with a first material to form the body part of the spike, a first punch, whose diameter is substantially smaller than the diameter of the cavity space in the mold, is fitted into the cavity space concentrically with the cavity space, and the annular space between the first punch and the cavity space is filled with a second material so as to form the wear-resistant surface layer for the spike, the first punch is removed, and the space remaining after said punch is filled with a third material, and the spike is pressed to the desired shape and density, whereinafter the spike is removed from the mold.

the apparatus in accordance with the invention comprises two molds so that the counter-faces of the first mold to be placed one against the other, are placed in the widest portion of the cavity space in the mold in the area of the foot widenings of the cavity space and that the press equipment comprises punches, which are fitted to act towards the second mold substantially perpendicularly to the counter-faces.

Compared with the prior-art structure, by means of the invention several advantages are obtained, whereof, e.g., the following may be stated. In the method in accordance with the invention, by pressing from one direction, it is possible to manufacture the hard tip part as well as the round forms in the foot part of the spike, the latter being of essential importance for the conduct of the spike in a tire. In the method and equipment in accordance with the invention, the wear-resistant outer face of the spike tip may be formed of desired thickness. If necessary, this wear-resistant outer face may be composed of several different materials. Since, in the method of the invention, the spike is manufactured in the mold by pressing from one direction, the tip portion of the spike is compressed more densely than the foot part. Since the foot part of the spike remains less dense than the tip, a spike of lower weight and lower consumption of material is obtained. A remarkable advantage of the equipment is simplicity of the mold structure, by means of which, however, the foot part of the spike, placed against the rubber, can be shaped freely. Moreover, the method of manufacture in accordance with the invention can be automated very easily.

BRIEF DESCRIPTION OF THE DRAWINGS

In the following, the invention will be described by way of example with reference to the FIGURES in the accompanying drawing, the invention being, however, in no way strictly confined to the exemplifying embodiment illustrated in the FIGURES.

PREFERRED EMBODIMENTS OF THE INVENTION

Figure 2:
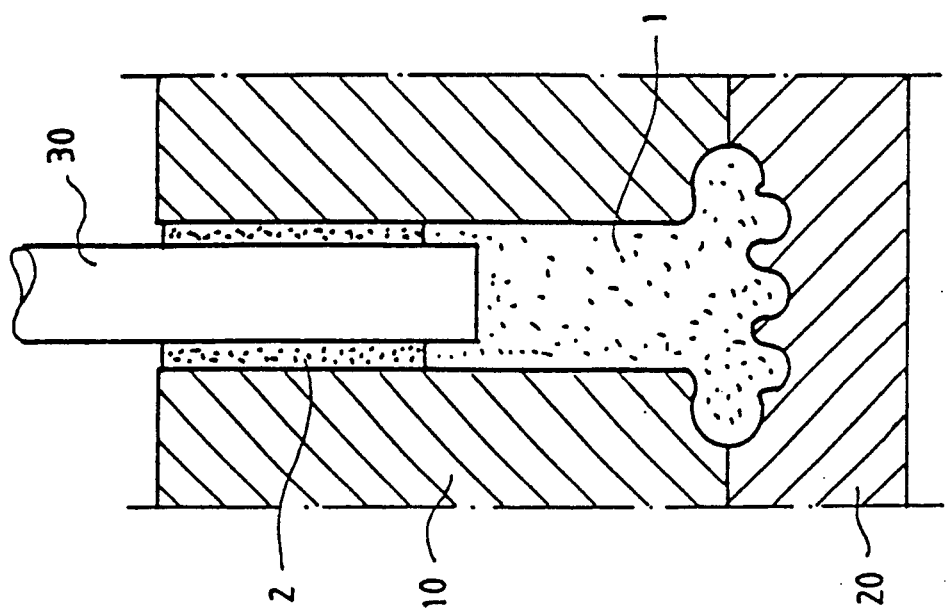
FIGS. 1 to 7 in the accompanying drawing are sectional views of a preferred apparatus used in the method of manufacture in accordance with the invention in the respective different steps of the method.

The equipment for the manufacture of a spike, shown in the FIGURES in the drawing, comprises a two-part mold, which comprises a first mold 10 and a second mold 20 to be fitted one against the other. Into the first mould 10 a through hole 11 has been formed for the body part and the tip of the spike to be manufactured. Into the hole 11 a first foot widening 12 has been formed for the foot of the spike in the area of the counter-face of the first mould 10 to be fitted against the second mold 20. In a corresponding way, into the second mould 20, a second foot widening 31 has been formed in the area of the counter-face 22 of the mold 20. The apparatus in accordance with the invention further includes a press device, which comprises a first and a second punch 30 and 40, by means of which the powdery materials of manufacture of the spike are pressed in the mold 10,109 20 to the shape required by the mold and to the desired density. The apparatus in accordance with the invention further comprises a filling apparatus for filling the mold with the materials of manufacture of the spike. The filling apparatus is, however, not shown in the FIGURES in the drawing. The filling apparatus may comprises, e.g., a suitable dosage funnel and related dosage means for filling the mold.

Figure 1:
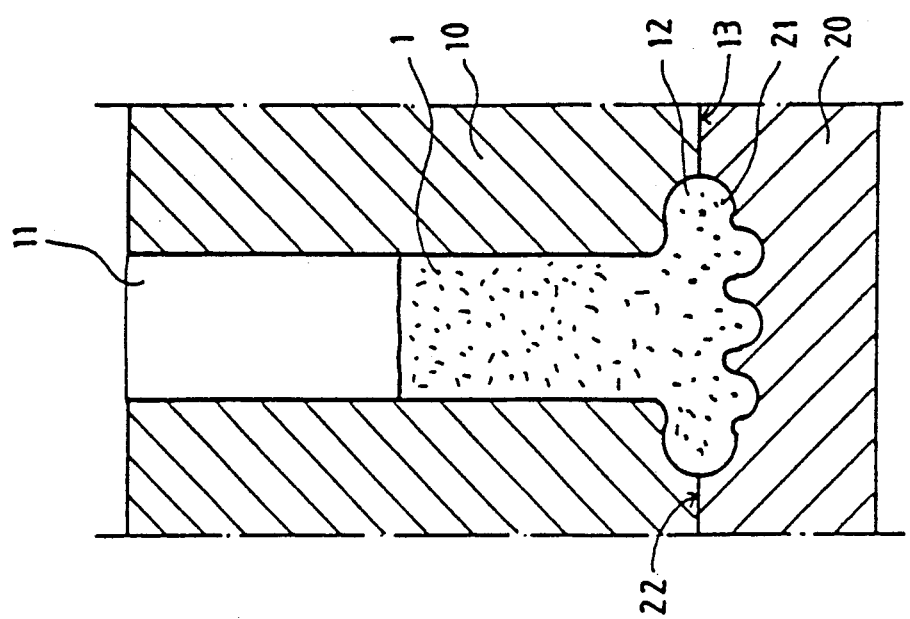

In FIG. 1 in the drawing, the first step of the method of the invention is shown. In the step shown in FIG. 1 the first mold 10 and the second mold 20 have been fitted one against the other by their counter-faces 13 and 22 so that the foot widenings 12 and 21 in the mold 10,20 are placed facing each other. In the first step of the method of manufacture, shown in FIG. 1, the mold 10,20 is filled with a first material 1, of which the body part and flange of the spike to be manufactured are composed.

FIG. 2 shows the second and the third step. In the second step of the method of manufacture, a first punch 30 is fitted into the hole 11 provided in the first mold 10, by means of which punch 30 the first material 1 of the spike, fitted into the mold in the first step, is pressed towards the second mold 20 so that filling of the mold is also guaranteed in the areas of the foot widenings 12 and 21. The diameter of the first punch 30 is smaller than the diameter of the hole 11, so that an annular space remains in the hole 11 around the first punch 30. In the third step of the method of manufacture, the annular space is filled with a second material 2 while the first punch 30 is in the hole 11 in the position shown in FIG. 2. Out of the second material 2, the annular wear-resistant part to be provided at the tip of the spike is formed.

Figure 3:
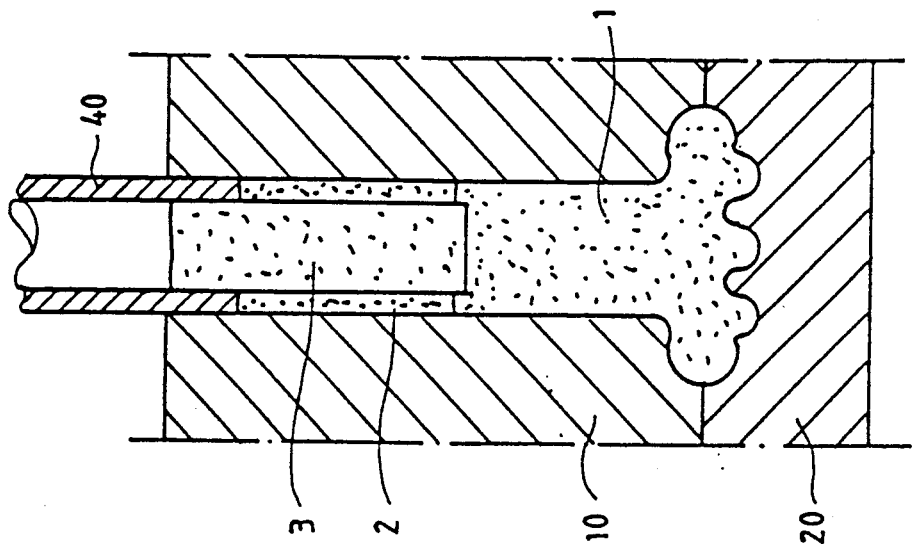
Figure 4:
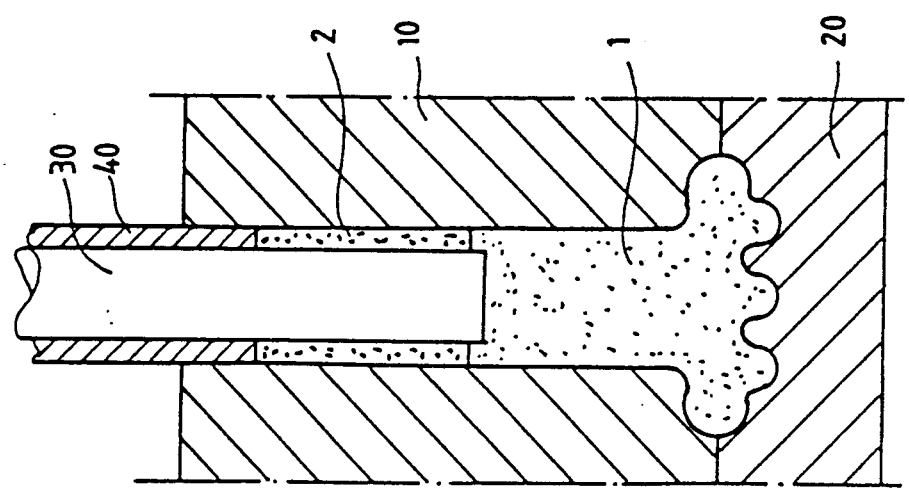
Figure 7:
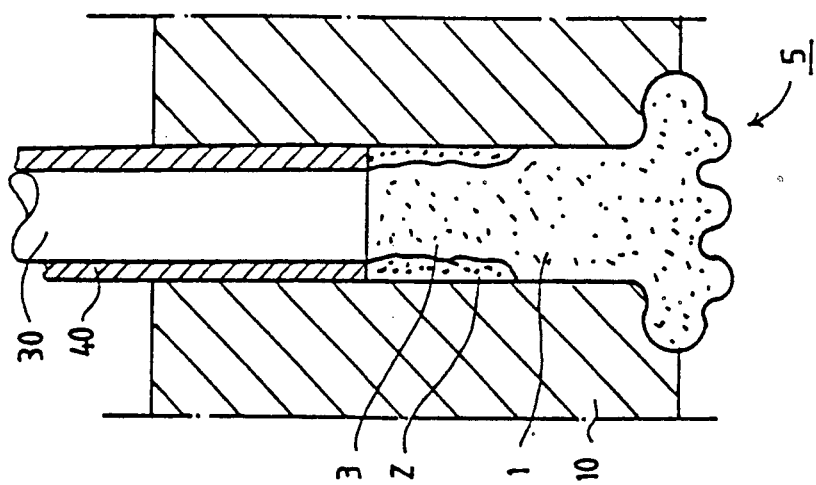

The fourth step of the method of manufacture is shown in FIG. 3. In this step of the method the second punch 40, which is placed on the first punch and is coaxial with the first punch 30, is fitted into the hole 11 provided in the first mold, this second punch moving in the same direction with the first punch 30. In the fourth step of the method of manufacture, shown in FIG. 3, an intermediate pressing of the spike blank is carried out by means of both of the punches 30,40 at the same time. On completion of the intermediate pressing the fifth step of the method of manufacture is reached, which is shown in FIG. 4. In this step the first punch 30, placed inside the second punch 40, is pulled out of the mold, and the mold is filled with a third material 3 while the second punch 40 is still in its position in the position shown in FIG. 4. Thus, by means of the third material 3, the space that remains inside the second material 2 and the second punch 40 is filled to the desired extent.

Figure 6:
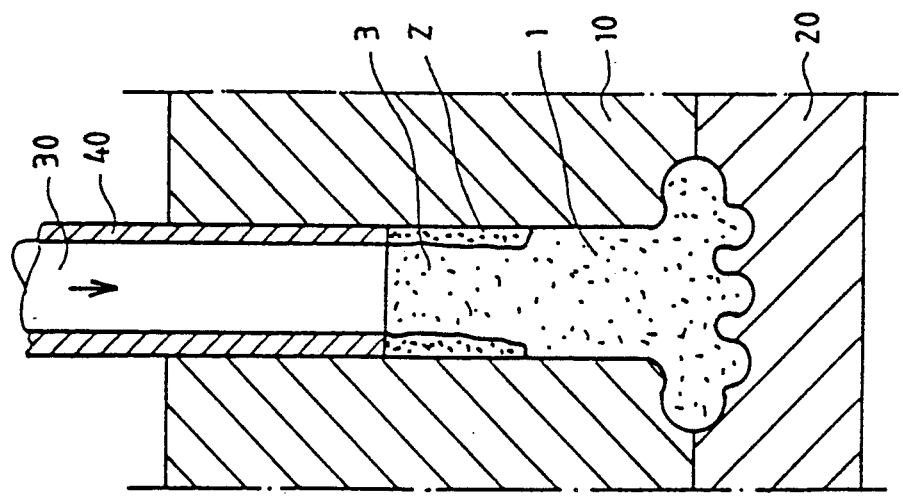
Figure 5:
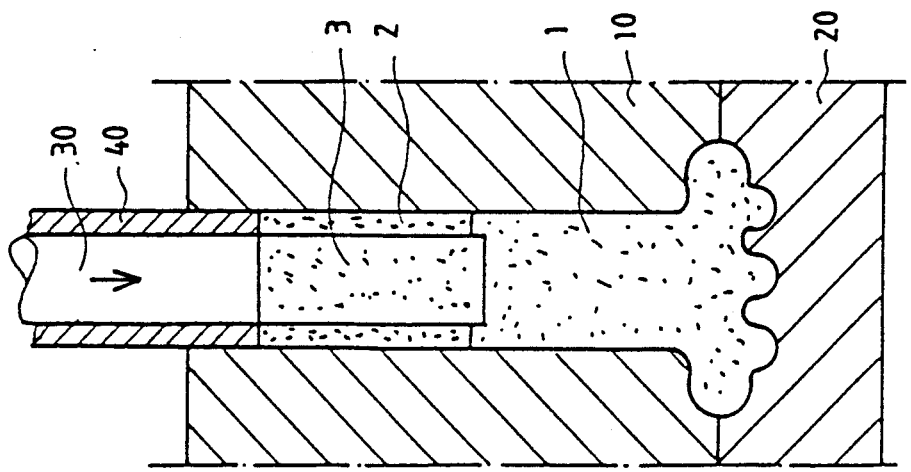

Upon completion of the filling with third material 3 the sixth step of the method of manufacture is reached, which is shown in FIGS. 5 and 6 and in which the pressing of the materials 1,2,3 to the desired density is carried out. This is performed so that first the third material 3 is pressed by means of the first punch 30. Both of the punches 30,40 may reach the same level, as is shown in FIG. 5, but this is not necessary. Hereinafter the final or ultimate pressing of the spike is carried out by means of both of the punches 30,40 at the same time in the way shown in FIG. 6, whereby the spike obtains its final shape and density. An alternative embodiment for this step of the manufacture is that, after the first and the second punch 30,40 have been pressed to the same level, the punches 30,40 are removed and a single punch is fitted in their place, whose diameter corresponds to the diameter of the second punch. The final pressing of the spike in accordance with FIG. 6 is then carried out by means of this single punch. AFter the final pressing has been completed, the last step of the manufacture is reached, i.e. removal of the spike 5 out of the mould 10,20. This is carried out so that the mold is opened by pulling the second mould 20 apart from the first mold 10. Hereupon the spike 5 is pushed out of the first mold 10 by means of the punches 30,40.

As regards the materials to be used in the manufacture of the spike 5, i.e. the first, second and the third material 1,2,3, the following can be stated briefly. As the first material 1, it is advantageously possible to use various ferritic, ceramic or equivalent sintering powders. Moreover, as the first material 1, it is also possible to use various mixtures or additives by means of which, for example, the compatibility of the spike foot with rubber or the gliding properties of the spike in the tire rubber are improved. Such mixtures are, e.g., various aluminum and graphite mixtures or the equivalent. The use of sintering powders is essential for the method in accordance with the invention, because, after the spike has been given its ultimate shape in the mould, it is sintered, i.e. subjected to a high temperature in an oven or the equivalent so as to give the product its ultimate hardness and strength. As the second material 2, of which the hard wear-resistant surface layer is formed for the spike, materials are used which have sufficiently high hardness. Such materials are, e.g., various sintering powders alloyed with tungsten, tantalum or titanium carbides or the equivalent. In the spike manufactured in accordance with the method, as the third material it is advantageously possible to use the same material as the first material 1. As an alternative, as the third material, it is possible to use a material or a material alloy by means of which the toughness and/or the bending strength of the spike is improved. By means of the use of such a material, e.g., the risk the spike can fracturing be reduced substantially.

Hereinbefore the invention has been described by way of example with reference to the FIGURES in the accompanying drawing. This is, however not supposed to confine the invention to the exemplifying embodiment shown in the FIGURES alone, but many variations are possible within the scope of the inventive idea defined in the following patent claims.

What is claimed is:

1. A method for the manufacture of a rivet for a fixed spike or for a sleeve-mounted spike, respectively, by pressing in a mold, said method comprising the following steps:

the cavity space in the mold, corresponding to the shape of the spike to be manufactured, is filled to the desired extent with a first material to form the body part of the spike, a first punch, whose diameter is substantially smaller than the diameter of the cavity space in the mold, is fitted into the cavity space concentrically with the cavity space, and the annular space between said first punch and the cavity space is filed with a second material so as to form the wear-resistant surface layer for the spike, the first punch is removed, and the space remaining after said punch is removed is filled with a third material, the spike is pressed to the desired shape and density, whereinafter the spike is removed from the mold, after the second material, which forms the surface layer, has been fitted into the mold, an intermediate pressing is carried out to compact at least said second material and the intermediate pressing is carried out by pressing by means of the first and a second punch, at the same time.

2. Method as claimed in claim 1, wherein the intermediate pressing is carried out by means of said second punch having an axial central hole therein, which is fitted concentrically on the first punch while the first punch is fitted in the cavity space in the mold.

3. Method as claimed in claim 2 wherein filling with the third material is carried out through the axial central hole in the second punch.

4. Method as claimed in claim 2, wherein for the ultimate pressing of the product the first and the second punch are removed and the ultimate pressing is carried out by means of a single third punch.

5. Method as claimed in claim 2, wherein the removal of the product out of the mold is carried out after opening of the mold by means of one or more punches by pushing in the pressing direction of the one or more punches.

6. Method as claimed in claim 2, wherein ferrous-metal based sintering powders or ceramic sintering powders are used as the first material.

7. Method as claimed in claim 2, wherein the material of the first material is alloyed with aluminum or graphite.

8. Method as claimed in claim 2, wherein a sintering powder alloyed with hardness-improving materials, i.e. tungsten, tantalum or titanium carbides, is used as the second material.

9. Method as claimed in claim 2, wherein the same material as the first material is used as the third material.

10. A method for the manufacture of a rivet for a fixed spike or for a sleeve-mounted spike, respectively, by pressing in a mold, said method comprising the following steps:

the cavity space in the mold, corresponding to the shape of the spike to be manufactured, is filled to the desired extent with a first material to form the body part of the spike, a first punch, whose diameter is substantially smaller than the diameter of the cavity space in the mold, is fitted into the cavity space concentrically with the cavity space, and the annular space between said first punch and the cavity space is filled with a second material so as to form the wear-resistant surface layer for the spike, the first punch is removed, and the space remaining after said punch is removed is filled with a third material, the spike is pressed to the desired shape and density, whereinafter the spike is removed from the mold, and, after the filling with the third material has been carried out, said third material is pressed by means of the first punch to the desired degree of compression.

11. A method for the manufacture of a rivet for a fixed spike or for a sleeve-mounted spike, respectively, by pressing in a mold, said method comprising the following steps;

the cavity space in the mold, corresponding to the shape of the spike to be manufactured, is filled to the desired extent with a first material to form the body part of the spike, a first punch, whose diameter is substantially smaller than the diameter of the cavity space in the mold, is fitted into the cavity space concentrically with the cavity space, and the annular space between said first punch and the cavity space is filled with a second material so as to form the wear-resistant surface layer for the spike, the first punch is removed, and the space remaining after said punch is removed is filled with a third material, the spike is pressed to the desired shape and density, whereinafter the spike is removed from the mold, and the ultimate pressing of the product is carried out by at the same time pressing by means of the first and a second punch.

* * * * *